United States Patent Office 2,839,356
Patented June 17, 1958

2,839,356

PROCESS OF REMOVING ACIDIC CONSTITUENTS FROM GASES UTILIZING SCREENED LOW BULK WEIGHT LUX MEANS

Alfred Karl, Essen, Germany, assignor, by mesne assignments, to Koppers Company, Inc., Pittsburgh, Pa., a corporation of Delaware No Drawing. Application June 14, 1954
Serial No. 436,720

3 Claims. (Cl. 23—3)

The present invention relates to a process for the removal of acid constituents, such as hydrogen cyanide, hydrogen sulphide, nitric oxide or the like, from gases containing the same, for example, coal distillation gases.

The invention relates more particularly to a process in which the gas to be purified is conducted through a charge of a solid purifier mass of the "Lux" mass type, the acid constituents being absorbed to a certain degree by the purifier mass.

Used to a large extent as purifier mass is the so-called "Lux" mass, which constitutes a waste product from the manufacture of aluminium, said product containing iron hydroxide and alkali. This lux mass is generally formed in a grain size between 0 and several millimetres. When loosely packed, it has a bulk weight of about 800 kg./m.$^3$ and, after light pressing, a bulk weight of about 850 kg./m.$^3$. In order to increase the gas permeability of the lux mass, wood shavings are frequently admixed therewith. It has also been proposed to press the lux mass to form shaped bodies, for example, small balls with a diameter up to 15 mm. These pressed bodies are either introduced directly into the purifier tank or are roughly broken, the finest parts being separated out before introducing the mass. It has also already been proposed to use the lux mass in admixture with other comparably coarse-grained substances, for example, in admixture with bog iron ore.

For many cases, it is desirable to increase the gas permeability of the lux mass without having to choose for this purpose the complicated and expensive course of producing pressed bodies or the like. In particular, relatively high demands are placed on the gas permeability of the lux mass when this is used by itself, i. e. without admixture of coarse-grained masses, and more especially when the special gas-purifying process permits a relatively high gas velocity in the purifier tank, for example, when using a gas with a high ammonia content.

It has now been found that the gas permeability of the lux mass, as it occurs in its manufacture, may be considerably improved by the fact that the lux mass is not introduced into the purifier tank in the usual manner with shovels or the like, but is screened directly into the purifier tank by means of a screen vibrating at comparatively high frequency in such manner that the bulk weight of the screen lux mass drops below 800 kg./m.$^3$, advantageously below 780 kg./m.$^3$. For screening the lux mass into the purifier tank, there is expediently employed a vibrating screen having a mesh size of about 2 mm., said screen vibrating at a frequency of about 1500 C./S. The oversize grains which perhaps remain on the screen may be separately reduced and thereafter returned to the screen again.

In practice, the process according to the invention is carried out in such manner that the vibratory screen is suspended on a chain above the purifier tank so that the entire area of the tank may be passed over by effortless movement of the screen. The mass is then screened until the permissible height on the intermediate bottoms is reached. A consolidation of the mass after screening does not take place. It is best for the marginal parts of the purifier mass which is introduced to be compressed slightly in order to prevent incorrect gas paths.

What I claim is:

1. In the process of removal of acid constituents from gas which comprises, passing gas containing hydrogen cyanide, hydrogen sulphide, nitric oxide and other like acid constituents through a solid purifier mass of the "Lux" mass type in a purifier tank to remove said constituents from said gas by contact with said mass, the step of introducing said Lux mass into the tank by vibratory screening the "Lux" mass, as generally formed originally in grain sizes between several millimeters and 0, directly into the tank from above the same by a screen with a mesh size of about 2 mm. while vibrating at a frequency of about 1500 C./S. so as to deliver the undersizes that pass through the screen during its vibration in the form of a bulk weight that is below 800 kg./m.$^3$.

2. The process as claimed in claim 1, wherein the oversize grains remaining on the screen are separately reduced in size and thereafter returned again to the screen.

3. The process as claimed in claim 2, and in which the through screenings are delivered at a bulk weight below 780 kg./m.$^3$.

References Cited in the file of this patent

UNITED STATES PATENTS

| | | |
|---|---|---|
| 1,818,615 | Gluud | Aug. 11, 1931 |
| 1,895,601 | Beuthner | Jan. 31, 1933 |
| 2,563,086 | Verschoor | Aug. 7, 1951 |
| 2,636,757 | Watson | Apr. 28, 1953 |

OTHER REFERENCES

Taggard: "Handbook of Mineral Dressing," pages 18–104, 18–105, 7–46, 7–48, New York, J. Wiley and Sons, 1945.